(12) United States Patent  
Furuskär et al.

(10) Patent No.: US 8,036,671 B2  
(45) Date of Patent: Oct. 11, 2011

(54) MULTI-CELLULAR LOAD DEPENDENT SCHEDULING

(75) Inventors: Anders Furuskär, Stockholm (SE); Per Skillermark, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 575 days.

(21) Appl. No.: 12/159,452

(22) PCT Filed: Dec. 27, 2005

(86) PCT No.: PCT/SE2005/002049  
§ 371 (c)(1),  
(2), (4) Date: Jan. 15, 2009

(87) PCT Pub. No.: WO2007/075129  
PCT Pub. Date: Jul. 5, 2007

(65) Prior Publication Data  
US 2011/0045838 A1    Feb. 24, 2011

(51) Int. Cl.  
*H04W 40/00*    (2009.01)

(52) U.S. Cl. ............ 455/449; 455/446; 455/452.2; 455/453; 455/513; 455/509; 370/230; 370/235; 370/238

(58) Field of Classification Search .......... 455/449, 455/446, 452.2, 453, 513, 509; 370/230, 370/235, 238  
See application file for complete search history.

(56) References Cited

U.S. PATENT DOCUMENTS

| | | | |
|---|---|---|---|
| 7,457,641 B1* | 11/2008 | Legnain et al. | 455/562.1 |
| 2004/0002341 A1* | 1/2004 | Chen | 455/453 |
| 2008/0153530 A1* | 6/2008 | Cho et al. | 455/513 |
| 2010/0130223 A1* | 5/2010 | Liao et al. | 455/453 |

OTHER PUBLICATIONS

Ahmed, M.H. et al: "Scheduling of multimedia traffic in interference-limited broadband wireless access networks" Wireless Personal Multimedia Communications, 2002. The 5th International Symposium on, vol. 3, pp. 1108-1112, Oct. 2002. See p. 1108, col. 1, line 23—col. 2, line 32; p. 1109, col. 2, line 4—p. 1110, col. 1, line 42, figures 1-2, abstract.

Dapeng, W. et al, "Downlink scheduling in a cellular network for quality-of-service assurance" Vehicular Technology, IEEE Transactions on, vol. 53 pp. 1547-1557, Sep. 2004. See p. 1547, col. 1, line 15—col. 2, line 45; p. 1555, col. 1, line 10—col. 2, line 31, abstract.

Litjens, R.; Van Den Berg, H., "Performance analysis of adaptive scheduling in integrated services UMTS networks," Mobile and Wireless Communications Network, 2002. 4th International Workshop on, vol., No. pp. 3-7, 2002.

* cited by examiner

*Primary Examiner* — Ajit Patel  
*Assistant Examiner* — Khai M Nguyen

(57) ABSTRACT

The present invention relates to a scheduler selector and a method for improving network quality by controlling inter-cellular interference of a multi-cellular mobile radio communication network. The radio communication traffic is controlled by a user traffic scheduler principle. The network quality is improved by selecting another scheduling principle among a number of pre-defined and selectable scheduling principles than the scheduling principle working for the moment in a cell in said network. Said selection being initiated as a result of an intracellular Quality data processing wherein the network quality is determined to be possible to improve.

14 Claims, 7 Drawing Sheets

PLMN

US 8,036,671 B2

MULTI-CELLULAR LOAD DEPENDENT SCHEDULING

TECHNICAL FIELD

The present invention relates to a method and apparatus for scheduling in multi-cellular networks.

BACKGROUND OF THE INVENTION

The present invention deals with the problem of intercellular interference, i.e. the decrease of transmission performance and quality due to the radio signal interference from radio traffic in adjacent cells in a cellular network.

The radio resources within a cell are usually limited, which means that a base station transceiver arrangement is not able to allocate a radio channel or radio link to every user of a mobile terminal which is active within the cell at every moment. Especially, modern mobile terminals are able to transmit and receive a lot of data information at high speeds, besides ordinary voice call communication. A lot of new services, e.g. Multi Media Services (MMS), are provided by the operators and other service providers. Said services demand user radio channels having enough bandwidth and transmission quality allowing data packet flows to be transmitted at high bit rates and received with a minimum of bit error rate and bit drop-out. Data services are expected to constitute a significant part of traffic in the third generation (3G) wireless networks. A number of technologies have been standardized to support high data rates and optimize the spectrum utilization of user downlink channels. High Data Rate (HDR) systems, defined in the 3GPP2 cdma 2000 IS-856 standard offer a maximum data rate of 2,4 Mbit/s over a signal bandwidth of 1,2 MHz, while their 3GPP equivalent High Speed Downlink Packet Access (HSDPA) systems offer a maximum data rate of around 10 Mbit/s over a signal bandwidth of 5 MHz. These systems deliver high spectral efficiency by using a TDMA-like strategy (the base station (BS) transmits at full power to only one user in each slot) with a combination of link adaptation, hybrid ARQ and opportunistic scheduling. Link adaptation refers to the adaptation of a user's transmission data rate to its radio conditions based on Data Rate control (DRC) signals sent back by the user to the base station. Hybrid ARQ (Automatic Repeat request) allows the transmission of any packet spread over multiple slots to be terminated early, i.e. as soon as the packet is successfully received, so as to adapt the transmission rate to the actual radio conditions. This control scheme, based on Chase combining or incremental redundancy, is essential given the errors in channel errors prediction and the necessarily conservative Signal-to-Noise Ratio (SINR) thresholds used to ensure a successful transmission A scheduler may be defined as a radio resource allocation function that determines what radio resources (e.g. time and frequency domain channels, here also denoted chunks) are used by what users (or data flows) and at what time instants. Desired characteristics of a scheduler include low delay and high throughput.

Several different scheduling principles exist. Examples are First-In-First-Out, Round Robin, Max-Rate and Proportional Fair, as well as score-based schedulers. These have different characteristics in terms of required input, complexity, and achievable delay, throughput and fairness results.

The scheduling algorithm is a key component of these time-shared systems. In addition to exploiting multi-user diversity over short time-scales, this algorithm also determines how resources are shared over longer timescales. An algorithm that always selects the user with the highest data rate is efficient in term of overall throughput but may starve low SINR users, typically located far from the base station. An algorithm that equalizes the data rates of active users, on the other hand is fair but inefficient as most radio resources are used to sustain the data rate of distant users. A third strategy, which realizes a reasonable trade-off between efficiency and fairness, consists in transmitting to the user with the highest data rate relative to its current mean data rate. This scheduler, termed Proportional Fair (PF), is widely used in currently developed systems.

It is actually necessary to account for the fact that the actual set of active users is dynamic and varies as a random process as new data flows are initiated and others complete. As each data flow is characterized by some amount of data to be transferred, the resource attributed to any user determines how long that user will stay active. In particular, an "efficient" strategy that selects always near users results in a steady state where most users with data left in their buffers are far from the base station. A "fair" strategy, on the other hand, results in a much more favourable steady state where users are more uniformly distributed in the cell. The fair scheduling strategies are often the most efficient in terms of average performance.

The interference between cells depends on the radio traffic intensity and the, necessary transmitting power. The necessary transmitting power increases with the distance between a user terminal and the base station. The distribution of active users within a cell will therefore influence the transmission quality in neighbouring cells. As an example, a large number of active users, i.e. user terminals, close to the border of a cell will generate more interference on the radio traffic in neighbouring cells than the same number of active users close to the base station. Some schedulers are able to restrict the radio traffic from active "long-distance users" in favour for active "short-distance users", while other schedulers work in favour for the active "long-distance users". Schedulers are also able to control the quality of each user link, here denoted user quality, within the cell by adapting the transmission power according to one or a number of link quality criteria. Different schedulers may be used for various performance optimizations in a single-cell. However, in multi-cell networks it is of interest to maximize the performance (e.g. bit rates) across all cells, here denoted the network quality. This is not necessarily accomplished by locally maximizing data flow performance, i.e. data packet flow, in each cell, here denoted the intracellular quality. This is because the interference generated may cause more nuisance in neighbour cells than it does good in the own cell. For instance, if each scheduler within a block of cells reacts by increasing their transmission power to increase the user link quality, the interference between the cells will increase resulting in a decrease of user link quality.

BRIEF DESCRIPTION OF THE INVENTION

The main object of the present invention is to solve the problem to improve network quality by controlling intercellular interference within a multi-cellular mobile radio telephone communication system.

This object is achieved by the present invention in the following way, which will first be described briefly in general terms here below, and in more detail in the detailed description of the invention further down.

In a base station of a cell, the intracellular quality of the transmission over the air interface is monitored, determined and transmitted to a defined set of external cells, such as neighbouring cells. The base station receives corresponding intracellular quality information data from a number of external cells, which each one monitors and determines their intracellular transmission quality, respectively. Said base station receives said quality data of said set of external cells, and a scheduler then controls the quality in the cell in dependence of its own intracellular quality data and the received intracellular quality information data from said set of external cells by selecting and running one of a number scheduling principles.

According to one embodiment of the present invention, if the intracellular quality is determined by comparison to be lower than or equal to the intracellular quality information data from said set of external cells, a scheduling principle is used that maximizes the user quality, e.g. the Quality of Service QoS, staying in the cell, increasing the intracellular quality within the cell, disregarding the interference to the transmission in the external cells it may cause.

If the intracellular quality is determined by comparison to be higher than the intracellular quality information data from said set of external cells, a scheduling principle is used that minimizes the interference to the transmission in the external cells, while still fulfilling some minimum performance requirements, if any such requirement is defined.

DETAILED DESCRIPTION OF THE INVENTION

In the description, different components and functionalities will be denoted according to the GSM (Global System for Mobile communications) and UMTS (Universal Mobile Telecommunication System) standards. However, a person skilled in the art will be able to identify corresponding component in other standards for cellular communications.

Figure 1:
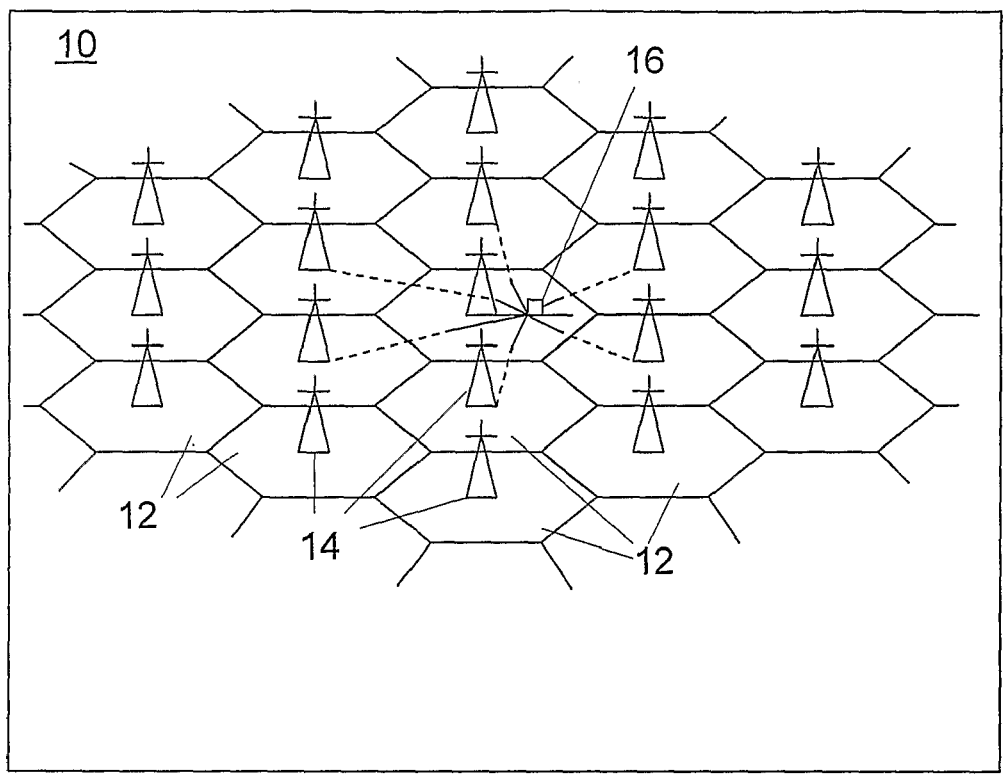
FIG. 1 illustrates a geographic area that is covered by a multi-cellular mobile radio telephone communication network for enabling the use of mobile terminals.

FIG. 1 illustrates a geographic area that is covered by a multi-cellular mobile radio telephone communication network for enabling the use of mobile terminals. The area is divided into a number of sub-areas. Each sub-area is called a cell, and is usually theoretically illustrated as a hexagon. The cellular structure is configured by use of cell planning methods. However, such methods are well established and subject to extensive documentation beyond the scope of the present invention and therefore a more detailed presentation is omitted. Each base station is connected to base station controller 16, e.g. such as a Radio Network Controller (UMTS standard).

Figure 2:
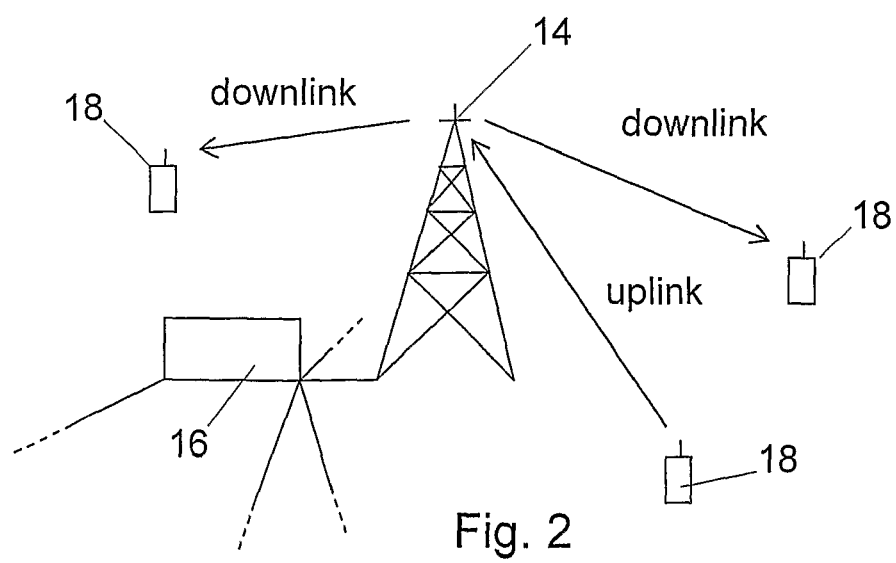
FIG. 2 illustrates a number of mobile terminals and a base station system communicating via the air interface either in the down link direction or in the up link direction.

The ability to use a mobile radio terminal 18 for radio communication purposes within a cell 12 is provided by a base station 14, denoted node B in UMTS, that is strategically located in the cell for accomplishing best possible radio signal coverage. In this schematic illustration, the base stations are located in the middle of the cells. A base station comprises at least one antenna, omni directional or directional, connected to a radio transceiver arrangement (see FIG. 3). As illustrated in FIG. 2, a mobile radio terminal 18 and a base station 14, or more correctly a base station system, is able to communicate via the air interface in both directions, up-link from the mobile terminal 18 to the base station 14, and down-link from said base station to the terminal. Thus, the mobile radio telephone communication network is a system of base stations, designed to handle the radio traffic between mobile terminals and base stations, connecting the base stations to each other and to other networks, such as PSTN, ISDN, LAN, WLAN etc. The transceiver arrangement 32 is monitored and controlled by a base station controller system, which could be located at the same site as the transceiver arrangement or at a totally different site.

Base station controllers, e.g. Radio Network controllers (RNC defined according to the well-known telecommunication standard UMTS), are well established and subject to extensive documentation and a more detailed presentation is considered to be unnecessary for the understanding of the invention. However, the different architectures will be interesting regarding different embodiments of the invention that will be further described below.

The radio communication traffic over the air interface between a node, such as node B or a base station, and mobile radio terminals within said cell's area of a multi-cellular mobile radio communication network is controlled by a user traffic scheduling principle. To improve network quality within said cell, another scheduling principle among a number of pre-defined and selectable scheduling principles than the scheduling principle working for the moment in a cell in said network, said selection being initiated as a result of an intracellular Quality data processing wherein the Network quality is determined to be possible to improve.

The invented method for improving network quality will now be described with reference to FIG. 8. A necessary preparation is to receive and process intracellular Quality data from a number of cells within said network. Said preparation is possible to perform in different ways, on different locations or by different means and with different output, such as a quality scalar or a quality vector matrix. The preparation step, step 110, will be discussed in more detail further down. The next step, step 120, of the method is to determine by using the result of the intracellular Quality data processing if the network quality is possible to improve. Also this determination step will be discussed in more detail as it is possible to perform in different ways. The most essential step, step 130, of the method is the selecting step which is performed if and when the network quality is determined to be improvable. The scheduling selector is capable of selecting another scheduling principle among a number of pre-defined and selectable scheduling principles than the scheduling principle working for the moment in the cell in said network. These steps constitute an algorithm that will be performed continuously or periodically according to a suitable time interval. The algorithm may also be activated by some trigger and performed once every time said trigger is detected. The trigger impuls may be generated by any suitable trigger means when ever the network or radio traffic in a cell is in some kind of special state.

The base station system is able to monitor and determine intracellular quality data $Q_{cell\ m}$ of the transmission over the air interface within the cell it is controlling and handling the radio traffic. The intracellular quality may be defined in different ways and defined according to different units of measurement, e.g. throughput [bps (bits per second)], delay [seconds], outage [percentage], PSU (percentage of Satisfied Users [%], normalized delay [1/bps], utility, etc.

Said intracellular quality data $Q_{cell\ m}$ is calculated by an intracellular quality means, receiving predetermined quality measures $q_{user}$ derived from each user channel quality or a number of user channel qualities for the moment in operation in the cell. Said quality measures $q_{user}$ may be selected from the group of quality measures defined as Quality of Service QoS, which is a well-known term to a person skilled in the art. Said QoS concept involves a number of quality entities defined in existing telecommunication and data transmission standards. Quality of Service may be defined and measured in different units, e.g. C (Carrier Strength), C/I (Carrier Strength/Interference), C/N (Carrier Strength/Noise), C/(I+N) (Carrier Strength/Interference+Noise), bit rate, delay, bit error rate, etc. Said quality measures $q_{user}$ are provided as input data to a intracellular quality data means 26 (see FIG. 3), which will use a predetermined mathematical algorithm or formula to determine a momentary value or measure of the intracellular quality $Q_{cell\ n}$ of the own cell. A new value/measure will be determined within a predetermined time interval later and will replace the present quality value in the next time interval. The momentary value will be used by the scheduler selector as input data.

Figure 3:
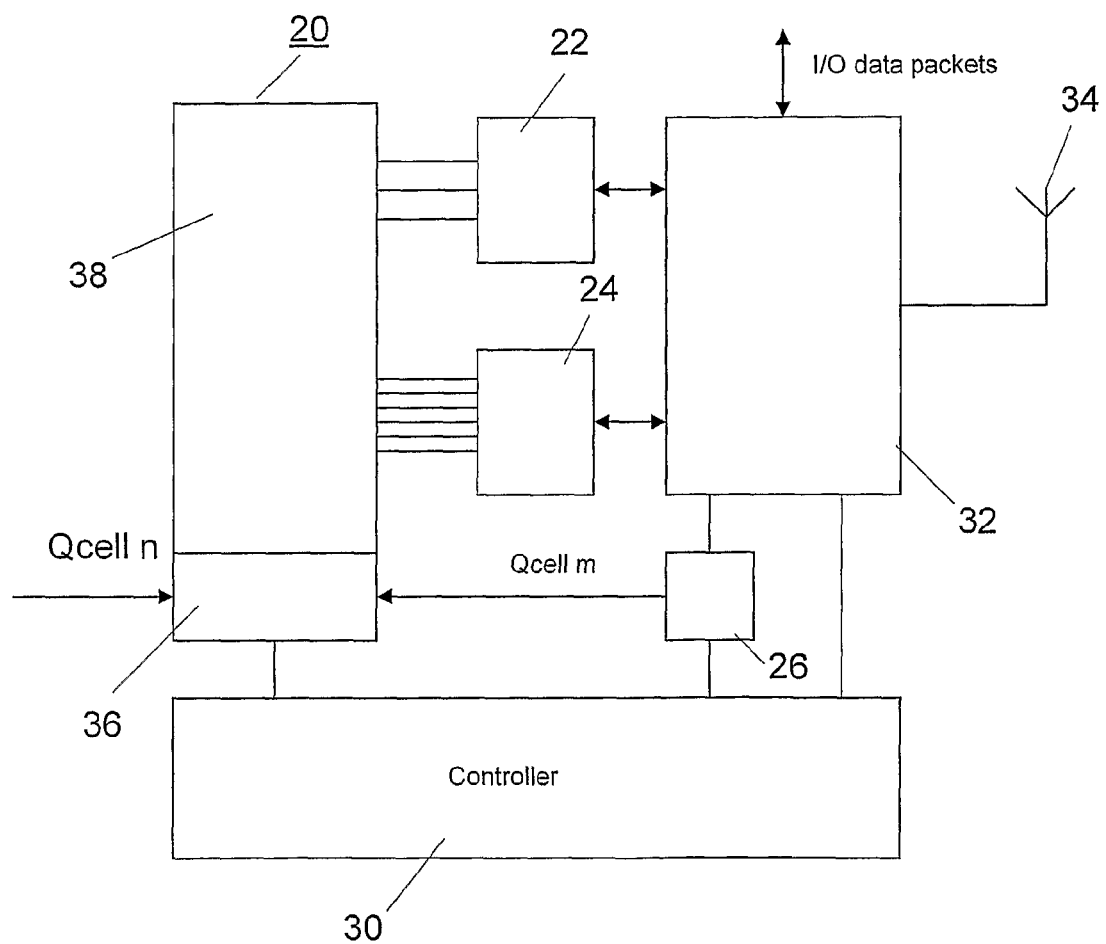
FIG. 3 illustrates an embodiment of the present invention.

FIG. 3 illustrates a number of components as schematic blocks within a base station system according to the present invention. A number of other base station system components are not shown as they are well established and subject to extensive documentation and a more detailed presentation is considered to be unnecessary for the understanding of the invention.

Via the antenna 34, omni directional or directional, the radio transceiver arrangement 32 is able to transmit radio traffic, such as data packet flow, signalling, voice calls etc, in a down-link channel and receive radio traffic in an up-link channel. It is desirable to improve or maximize the performance (e.g. bit rates) across all cells. This is not necessarily accomplished by locally maximizing data flow performance, i.e. data packet flow, in each cell, because the interference generated may cause more nuisance in neighbour cells than it does good in the own cell. To address this problem, the present invention is presented in more detail below.

The present invention also comprises a scheduler selector 20 and a scheduler set 22, 24. The scheduler set comprises a set of schedulers 22 and 24, scheduling according to different principles. The schedulers constitute the radio resource allocation function that determines what radio resources (e.g. channels or chunks (sub-channels)) are used by what user terminals (or data flows) and at what time instants.

Each scheduler 22, 24 in the set has a separate input for receiving necessary input information data to be able to operate properly, as each scheduler may need different information data for its scheduling function. The scheduler selector is designed to provide the necessary Scheduler Control Commands SCn and input information data to the operating scheduler, i.e. selected to be in operation by the scheduler selector. When the selected scheduler 22 is in operation mode, the other scheduler 24 is set in a stand-by mode, or idle mode, and is not supplied with input data. Thus, it is relevant to define different sets of scheduler input data, one set for each scheduler.

The schedule selector 20 will be able to control user quality in the cell, and thereby its own intracellular quality, in dependence of its own intracellular quality data and the received intracellular quality information data from said set of external cells by selecting and running one of the schedulers at a time of the scheduler set.

The scheduler selector 20 is also arranged to receive and handle intracellular quality data from a number of external cells, which each one comprises corresponding means for monitoring and determining their intracellular transmission quality. A set of external cells, such as neighbouring cells, has to be defined by the operator of the base station system.

According to one embodiment, the scheduler selector 20 comprises a intracellular data processing means 36, which is arranged to determine, e.g. by use of a calculation formula or method, if the network quality, e.g. traffic performance, is possible to improve by processing intracellular quality data $Q_{inter}$.

The schedule selector 20 also needs the intracellular transmission quality $Q_{cellm}$, i.e. the intracellular transmission quality in the own cell, for being able to perform the selection step 130. A cell has an own intracellular transmission quality $Q_{cell1}$, said value may be compared to each of the set of received intracellular quality data $Q_{cell2}, Q_{cell3}, \ldots, Q_{cellN}$. The intercellular measure $Q_{inter}$ may be represented in different ways. One representation of the intercellular measure $Q_{inter}$ is a vector matrix comprising the set of received intracellular quality data, e.g. $Q_{cell2}, Q_{cell3}, \ldots, Q_{cellN}$, i.e. $Q_{inter} = \{Q_{celln}, m \neq n\}$, where m and n are integers, m indicating the cell for which a scheduler is to be selected. If the cell's own intracellular transmission quality $Q_{cell1}$, the vector matrix components are $Q_{cell2}, Q_{cell3}, \ldots, Q_{cellN}$. Another representation of the intercellular measure $Q_{inter}$ is a scalar unit calculated from the received intracellular quality data $Q_{cell2}, Q_{cell3}, \ldots, Q_{cellN}$. The intracellular transmission quality $Q_{cell1}$ can be compared to said scalar unity $Q_{inter} = f_{inter}\{Q_{celln}, m \neq n\}$, where m and n are integers, m indicating the cell for which a scheduler is to be selected and $f_{inter}$ is a mathematical function for calculating a scalar unity from the variables $Q_{celln}$.

Generally, a Scheduler selector 20 belonging to a cell m is provided with selecting means 38 that is able to select a scheduler in a Scheduler Set $S_{ms} = \{S_{mj}\}_{j=1}^{J}$ (22,24) comprising J different schedulers, wherein j is the Scheduler index starting from scheduler number 1 up to scheduler number J. The Scheduler Selector will operate according to a selection function $f_{ss}$. Hence, the Scheduler selection operation may be described as $S_{mj} = f_{ss}(\{Q_{celln}, Q_{inter}\})$, where $f_{ss}$ is the selection function used for selecting a special Scheduler $S_{mj}$ of a set of available schedulers $\{S_{mj}\}_{j=1}^{J}$ in cell m (cell m indicates a cell with a number m within a cluster of cells).

In a node, e.g. a base station, Radio Network Control RNC, belonging to one or more cell(s) of a multi-cellular network, the intracellular quality is monitored and determined, and thereafter transmitted to each of the other nodes belonging to the set of external cells, such as neighbouring cells. The nodes receive corresponding intracellular quality information data $\{Q_{celln}$; not the own cell m$\}$ from a number of external cells. Each node receives quality data of said set of external cells, and a scheduler selector for each cell then controls the quality in the cell in dependence of its own intracellular quality data and the received intracellular quality information data from said set of external cells by selecting and running one of a number scheduling principles. If all the intracellular quality data is gathered to define a Network Quality measure $Q_{tot} = (Q_{cell1}, Q_{cell2}, Q_{cell3}, \ldots, Q_{cellN}) = \{Q_{celln}\}$, the invention may be described as improving $Q_{tot}$ by continuously or periodically finding and improving the lowest intracellular quality, i.e. min $\{Q_{celln}\}$, by changing scheduler in the corresponding cell.

The schedule selector 20, comprising the selecting means 38 and the processing means 36, is possible to implement as software program instructions executable by a controller 30, such as a micro-processor, CPU (Central Processing Unit), computer, including necessary In/Out units and program memory storage and data storage. It is also possible to implement the selector as program instructions in hardware.

The present invention will now be explained in more detail by means of a few embodiments.

According to a first embodiment of the present invention, the selection $f_{ss}$ is a comparison function. A special Scheduler $S_{mj}$ of a set of available schedulers $\{S_{mj}\}_{j=1}^{J}$ in cell m will be selected according to $S_{mj}=f_{ss}(\{Q_{cellm}, Q_{inter}\})$, where $f_{ss}$ is the selection function that will compare the intracellular quality $Q_{cellm}$ and the intercellular $Q_{inter}$. If $Q_{cellm}$ is determined by comparison to be lower than or equal to the lowest intracellular quality information data components $Q_{celln}$ of said set of external cells, a scheduling principle $S_{mj}$ is selected and used for maximizing the transmission quality for the users staying in the cell, but that will also increase the intercellular interference, i.e. disregarding the interference to the transmission in the external cells it may cause. The Quality measure may therefore be defined as a scalar unity $Q_{inter}=f_{inter}\{Q_{celln}, m\neq n\}$, where m and n are integers, m indicating the cell for which a scheduler is to be selected and $f_{inter}$ is a minimum value function for calculating a scalar unity according to $Q_{inter}=\min(Q_{cell1}, Q_{cell2}, Q_{cell3}, \ldots, Q_{cellN}; Q_{cellm}$ is not included). The scheduling selector function may be defined as: $f_{ss}(\{Q_{cellm}, Q_{inter}\})=$"maxQ" if $Q_{cellm}<Q_{inter}$, and "minI" otherwise, where "maxQ" corresponds to a scheduler that maximizes the intracellular quality, and "minI" corresponds to a scheduler that minimizes the generated interference.

Further one embodiment of the invention will now be described. In this example, only two schedulers are used, but a person skilled in the art will with guidance from this example understand how to adapt the described method to include more than two schedulers. The first scheduler is a proportional fair scheduler with a scheduling threshold $q_{min}=q_0$, and the second scheduler is a proportional scheduler with a scheduling threshold $q_{min}=q_1$. Both schedulers calculate the ratio $q_u$ between instantaneous and averaged quality for all users in the cell, e.g. through $q_u=q_{user\ u}/\text{mean}(q_{user\ u})$. The scheduler in operation then schedules the user with the highest $q_u$, provided that said $q_u$ exceeds a minimum value (ratio) $q_{min}$.

Figure 7A:
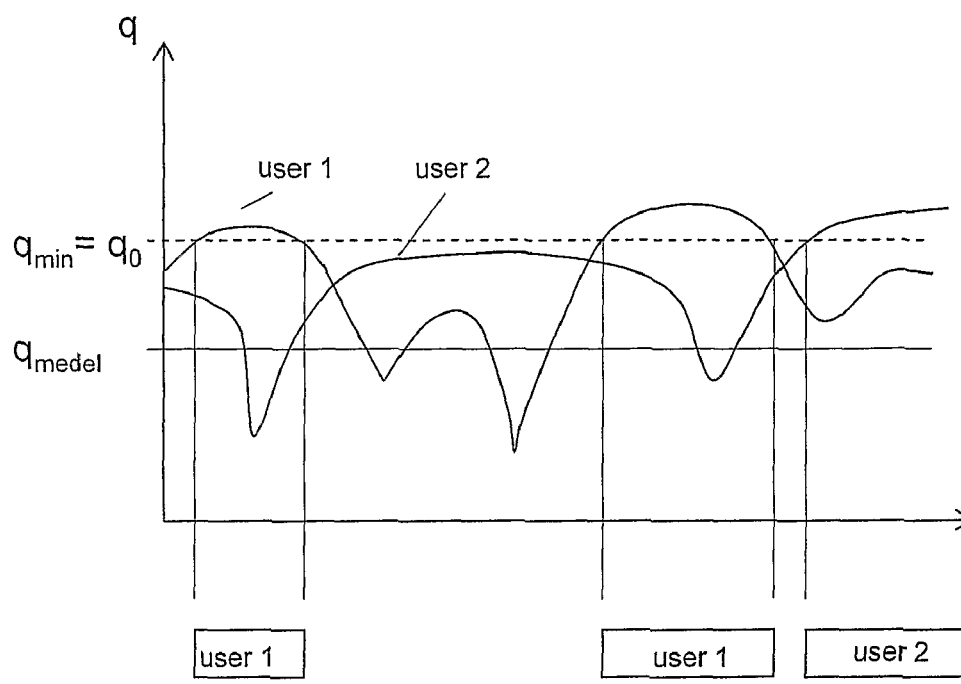
FIGS. 7a and 7b are two user quality diagrams illustrating how two users will be scheduled depending on the level of the scheduling threshold.
Figure 7B:
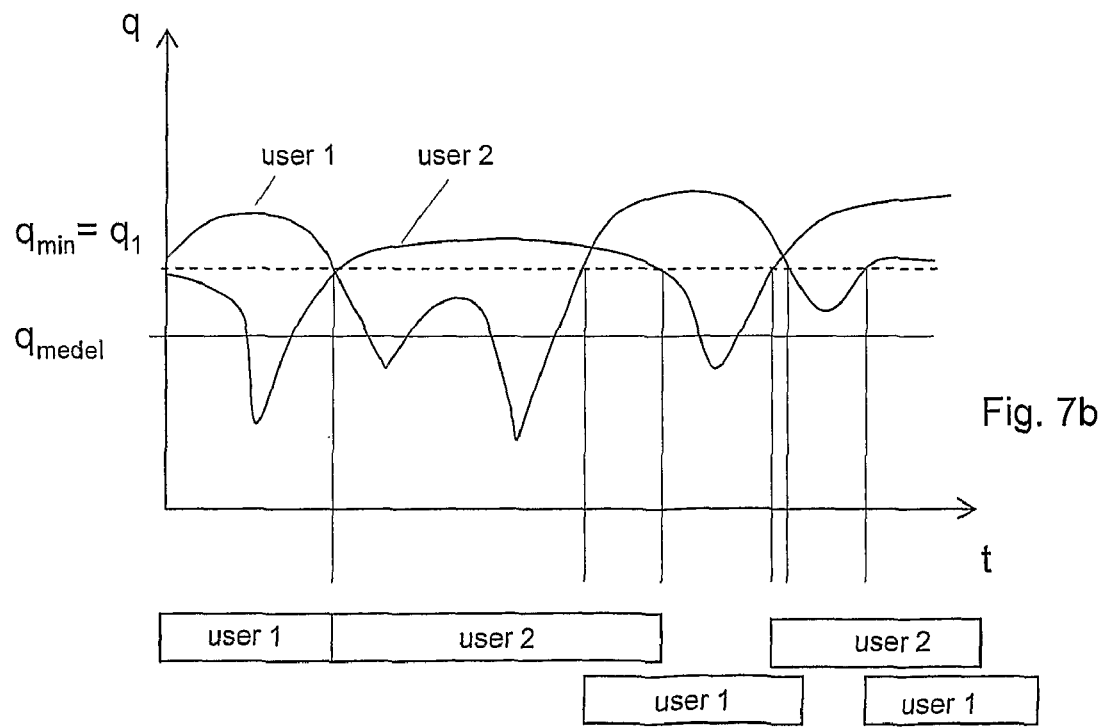

In FIGS. 7a and 7b, the scheduling results for two users are illustrated when using two schedulers, one scheduler with a higher scheduling threshold $q_{min}$, and the same scheduler with a lower scheduling threshold $q_{min}$. Even though the schedulers are similar and only differs regarding the choice of threshold, each scheduler is here considered to represent another scheduler principle. The two graphs represent the quality measure ratio $q_u$ between instantaneous and averaged quality along time for two users, user 1 and user 2, in the cell. As illustrated below each diagram, the scheduler will schedule the user with the highest $q_u$ provided that said $q_u$ exceeds a minimum value (ratio) $q_{min}$.

With a high $q_{min}$, as illustrated in FIG. 7a, users are only scheduled under very good radio conditions and thereby causing little interference.

With a low $q_{min}$, as illustrated in FIG. 7b, users are scheduled more frequently, leading to smaller delays and higher throughput in the own cell. The increased radio traffic will cause increased interference in neighbouring cells.

Using these two schedulers, wherein the first scheduler has a scheduling threshold $q_0$ and the second scheduler has a scheduling threshold $q_1<q_0$. In this embodiment the invention may be described using the following steps (compare FIG. 8):
1. Preparation step 110: Measure and distribute the own-cell and neighbour cell qualities $Q_m$ and $Q_{inter}$.
2. Determination step 120 (possible to improve the Network quality)
2a. If $Q_{cellm}>Q_{inter}$ ("yes"—route in flow chart FIG. 8): perform the select step 130 and select the scheduler with the higher scheduling threshold, i.e. the first scheduler having a scheduling threshold $q_0>q_1$. The minimum ratio $q_{min}$ for scheduling is set to $q_0$.
If 2a is "no":
2b. Else $Q_{cellm}\leq Q_{inter}$ ("yes"—route in flow chart FIG. 8):perform the select step 130 and select the scheduler with the lower scheduling threshold, i.e. the second scheduler having a scheduling threshold $q_1<q_0$. The minimum ratio $q_{min}$ in for scheduling is set to $q_1$.

In a third embodiment of the invention, a max-rate scheduler and a proportional fair scheduler are used alternately. The max-rate scheduler reaches a higher bitrate than the proportional fair (PF) scheduler, but does not necessarily schedule users under their relatively best link conditions. The max-rate scheduler therefore generates more interference than the PF scheduler for a finite offered traffic Different architectures of the controller system are possible. Said controller system may be situated in a centralised controller entity, which is simultaneously controlling the radio traffic in a number of cells. In this totally centralised controller system, all control functions will be centralised and the separate base stations will only receive control commands. The base stations of the different cells share the same RNC, which is suitably located somewhere, possibly, within one of the cells it is controlling (see FIG. 1). In a second architecture, each cell has its own RNC, which will only control the radio traffic within the own cell. The cells and base stations do not share a common RNC. The different RNCs are preferably able to communicate with each other, and it is therefore possible to transmit signalling and data information between the RNCs. In a third architecture or embodiment, some of the control functions are distributed to the separate cells, preferably to the base station of each cell, and some of the control functions are centralised to the common RNC. This third embodiment is a kind of hybrid controlling system of the first and second described architectures. However, common for all three architectures is that a cell and its base station are controlled by a set of control functions and said functionality will hereafter be denoted a Base Station Controller Systems (BSCS).

Hence, in one architecture, all BSCSs for the separate cells are gathered in a common, centralised RNC. In another architecture, each cell has its own RNC within or close to the base station, i.e. each cell BSCS is the same as the cell RNC. In both architectures, the BSCS is totally integrated in the RNC, but the RNC of the second architecture contain only one separate BSCS. Alternatively, this case could also be seen as having the BSCS fully integrated in the base station. In yet another embodiment, the hybrid controller system, the control functions of the BSCS is distributed between the RNC and the Base Station.

In summary, the BSCS includes the scheduling selector (SS) 20 and the function $f_{inter}$ that calculates $Q_{inter}$. The architecture options are then:
SS and $f_{inter}$ both reside in the RNC (FIG. 4);
both $f_{inter}$ and SS reside in the base stations (FIG. 5);
$f_{inter}$ resides in the RNC but SS is in the base stations (FIG. 6).

Figure 4:
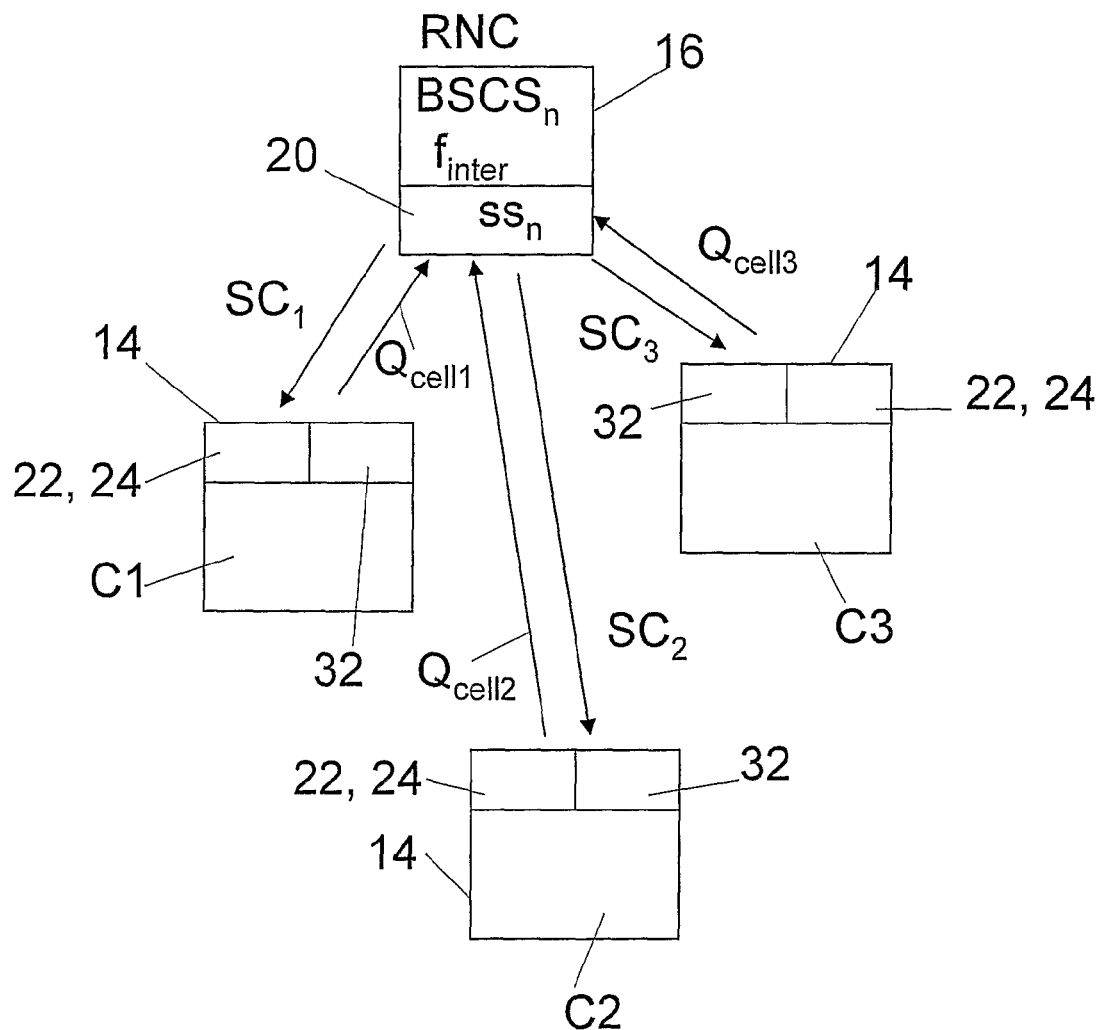
FIGS. 4-6 are block diagrams illustrating schematically the three different architectures of base station controller systems.
Figure 5:
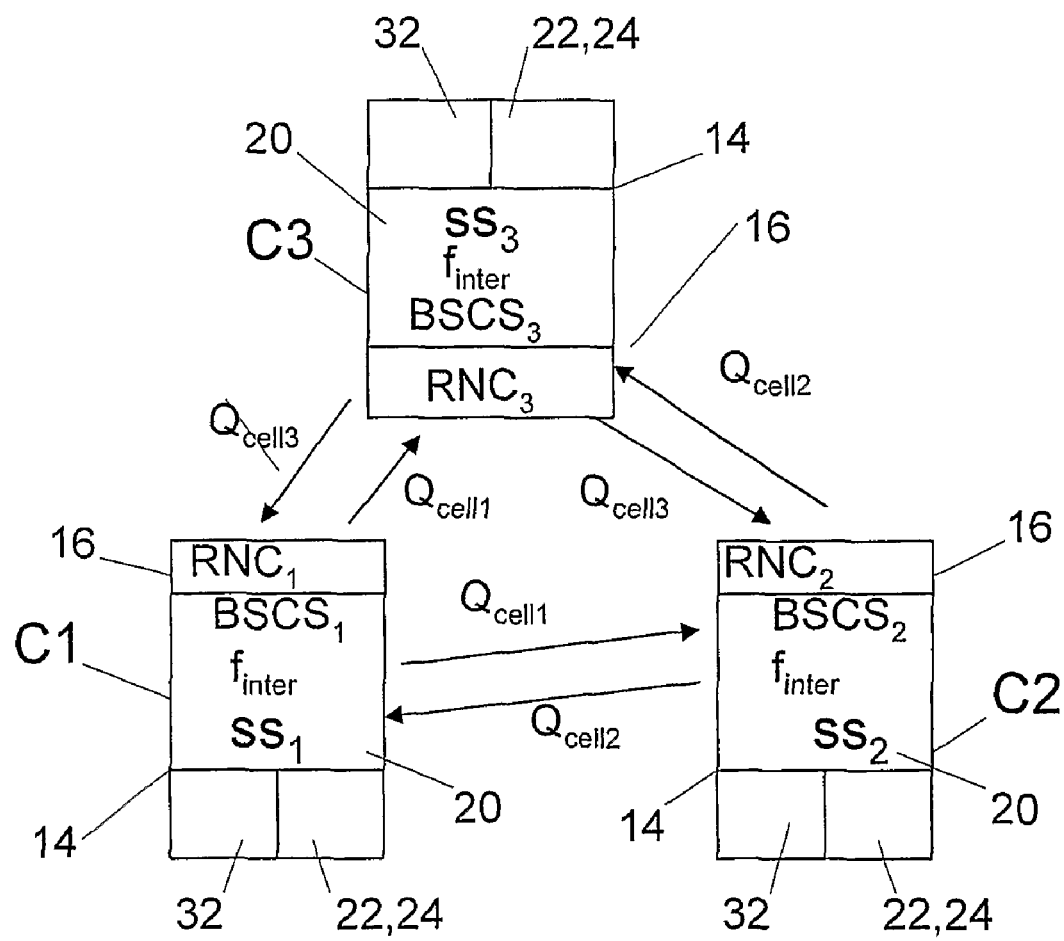
Figure 6:
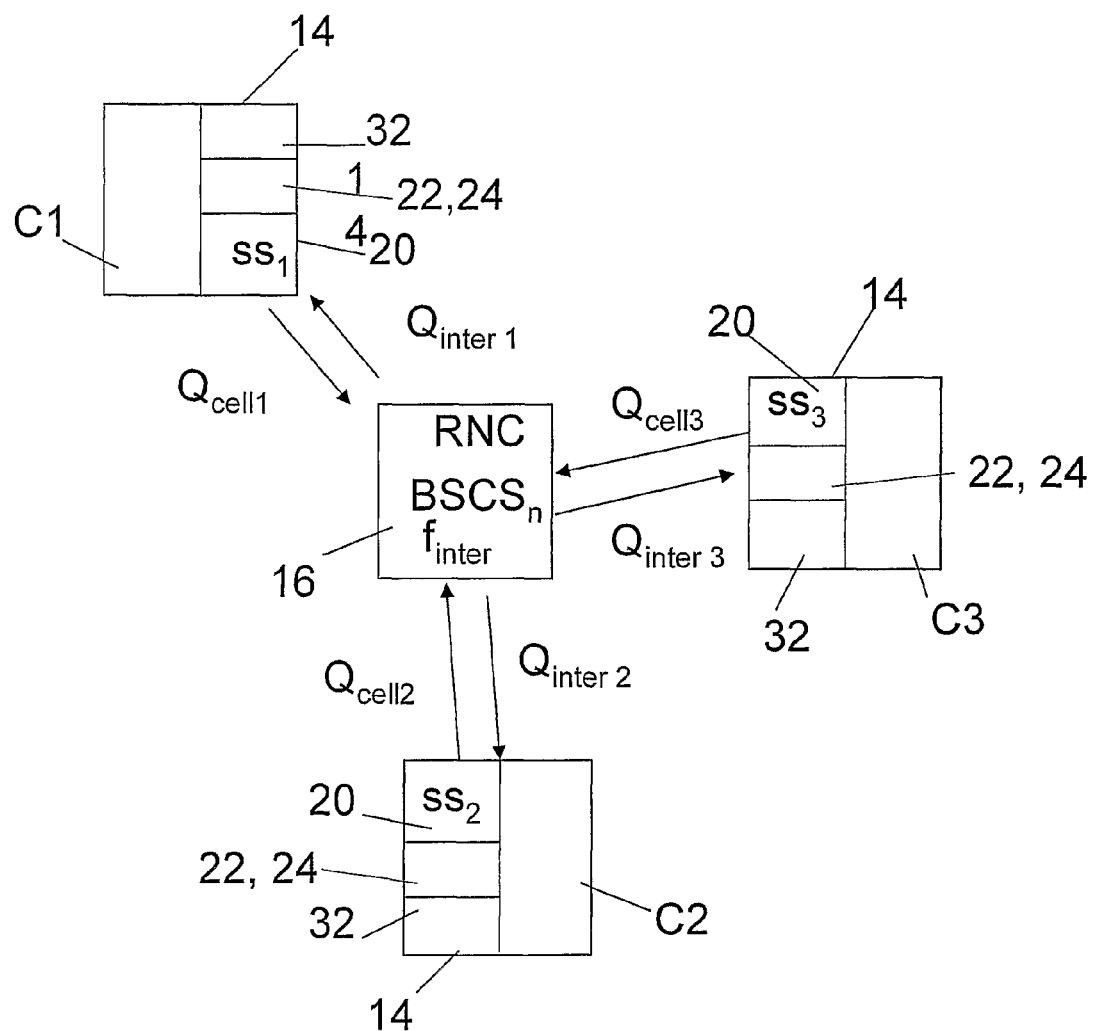

FIGS. 4-6 illustrate schematically the three different architectures, respectively, which in the following will be described one by one in more detail.

FIG. 4 is a block scheme illustrating a controller system according to the first architecture. The base stations, even called node Bs according to the UMTS telecommunication standard, of three different cells C1, C2 and C3 share the same Radio Network Control RNC 16. Each cell's base station controller 30 comprising $BSCS_n$ is centralised to the common RNC 16. Each separate $BSCS_n$ in the RNC 16 is able to communicate with the corresponding base station 14. Each separate $BSCS_n$ is arranged to communicate with a corresponding Scheduler Selector $SS_n$ 20 and a set of Schedulers 22, 24 chosen for controlling the traffic within the cell Cn. The RNC will receive Quality information $Q_{cellm}$ from each base station/Node B 14. The function $f_{inter}$ for determining $Q_{inter\ w}$ will be arranged to calculate the correct $Q_{inter\ m}$ and distribute said quality information to the base station 14 of cell m. Each scheduler selector 20 will be able to chose the most suitable scheduler 22, 24 due to the received quality information. The scheduler selector 20 is designed to provide the necessary Scheduler Control Commands $SC_n$ and input information data to the operating scheduler that is connected to the transmission arrangement 32 of the base station 14. Each scheduler selector 20 comprises a function $f_{inter}$ that calculates $Q_{inter}$ for each cell Cn.

In FIG. 5, the second architecture is illustrated. Each cell Cn has its own $RNC_n$ 16 and Base station 14. It is therefore acceptable to consider the RNC and base station 14 as an integrated entity comprising a controller 30 and $BSCS_n$, which base station 14 will control the radio traffic within the own cell Cn. The cells Cn do not share a common RNC 16. The different RNCs 16 are preferably able to communicate with each other, and it is therefore possible to transmit signalling and data information, such as the current Quality information $Q_{cell\ m}$, between the RNCs 16. There will be an exchange of Quality information $Q_{cell\ m}$ via protocol, e.g $RNC_1$ will distribute $Q_{cell\ 1}$ by use of a suitable protocol to the other RNCs. The scheduler selector 20 is designed to provide the necessary Scheduler Control Commands and input information data to the operating scheduler (22 or 24) that is connected to the transmission arrangement 32 of the base station 14. Each scheduler selector 20 comprises a function $f_{inter}$ that calculates $Q_{inter}$. It is possible to use different sets 22,24, which comprises different schedulers, to control the traffic in the different cells. This is also possible for the next embodiment.

The third architecture or embodiment is illustrated in FIG. 6. Some of the control functions that belongs to a $BSCS_n$ are distributed to the Base stations 14 of the separate cells Cn, and the rest of the control functions in $BSCS_n$ are centralised to the common RNC 16. This third embodiment is a kind of hybrid controlling system of the first and second described architectures. The Scheduler Selector 20 is integrated with the scheduler set 22,24 and the transmitter arrangement 32 in the Base Station 14. Each separate $BSCS_n$ in the common RNC 16 is able to communicate with the corresponding $BSCS_n$ in the base station 14 and corresponding Scheduler Selector $SS_n$ and the set of schedulers 22,24. For example, the function $f_{inter}$ is located in the RNC and will be arranged to calculate the correct $Q_{inter\ m}$ and distribute said quality information to the base station 14 of cell m. The RNC 16 will receive Quality information $Q_{cell\ m}$ from each base station 14.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for improving network traffic performance defined by a network quality measure by controlling intercellular interference of a multi-cellular mobile radio communication network, wherein the radio communication traffic is controlled by a user traffic scheduler principle, wherein said method comprises the steps of:
   receiving and processing intracellular Quality data ($Q_{celln}$, $Q_{cellm}$) from a number of cells within the network to determine the network quality measure;
   determining, by using the result of the intracellular Quality data processing and the network quality measure, whether to initiate a selection of another scheduling principle in a cell in the network than the scheduling principle working for the moment in the cell, or not; and
   selecting, if a selection is initiated by the determining step, another scheduling principle among a number of predefined and selectable scheduling principles than the scheduling principle working for the moment in said cell.

2. The method according to claim 1, wherein the method involves a step of:
   processing intracellular Quality data from a number of cells within said network, said processing resulting in a $Q_{inter}=\{(Q_{celln},\ m\neq n\}$ comprising the set of received intracellular quality data $Q_{cell2}$, $Q_{cell3}$, ..., $Q_{cellN}$, or a scalar unity $Q_{inter}=f_{inter}\{Q_{celln},\ m\neq n\}$.

3. The method according to claim 1, characterized in that the step of selecting involves:
   selecting a scheduling principle improving the user transmission quality, thereby increasing the intracellular transmission quality within the cell, if the intracellular quality is determined by comparison to be lower than or equal to the intracellular quality information data from a set of external cells in the surrounding of said cell.

4. The method according to claim 1, wherein the step of selecting involves:
   selecting a scheduling principle that reduces the transmission quality for at least some of the cell users, decreasing the intracellular transmission quality within the cell, and decreasing the interference to the transmission in the external cells, while still fulfilling any defined minimum performance requirement, if the intracellular quality is determined by comparison to be higher than the intracellular quality information data from said set of external cells in the surrounding of said cell.

5. The method according to claim 1, wherein the step of selecting involves:
   switching between two scheduler principles having different scheduling thresholds ($q_0$).

6. The method according to claim 1, wherein the step of selecting involves:
   selecting a proportional fair scheduler if the intracellular quality is determined by comparison to be higher than the intracellular quality information data from said set of external cells, and;
   selecting a max-rate scheduler, if the intracellular quality is determined by comparison to be lower than or equal to the intracellular quality information data from said set of external cells.

7. The method according to claim 1, wherein the defined set of external cells are neighbouring cells.

8. A scheduler selector for improving network traffic performance by a network quality measure by controlling intercellular interference of a multi-cellular mobile radio communication network, wherein the radio communication traffic is controlled by a user traffic scheduler, wherein the scheduler selector comprises processing means for processing intracellular Quality data ($Q_{celln}$, $Q_{cellm}$) from a number of cells within the network and for determining by using the result of the intracellular Quality data processing whether to initiate a selection of another scheduling principle among a number of predefined and selectable scheduling principles in a cell in the network than the scheduling principle working for the moment in the cell, or not, and selecting means that is arranged to select, if a selection is initiated by the processing means, another scheduling principle for working in said cell.

9. The scheduler selector according to claim 8, wherein the intracellular Quality data from a number of cells within said network are processed, said processing resulting in a $Q_{inter}=\{Q_{celln}, m \neq n\}$ comprising the set of received intracellular quality data $Q_{cell2}, Q_{cell3}, \ldots, Q_{cellN}$, or a scalar unity $Q_{inter}=f_{inter}\{Q_{celln}, m \neq n\}$.

10. The scheduler selector according to claim 8, wherein the selecting means is arranged to select a scheduling principle improving the user transmission quality, thereby increasing the intracellular transmission quality within the cell, if the intracellular quality is determined by comparison to be lower than or equal to the intracellular quality information data from said set of external cells in the surrounding of said cell.

11. The scheduler selector according to claim 8, wherein the selecting means is arranged to select a scheduling principle that reduces the transmission quality for at least some of the cell users, decreasing the intracellular transmission quality within the cell, and decreasing the interference to the transmission in the external cells, while still fulfilling any defined minimum performance requirement, if the intracellular quality is determined by comparison to be higher than the intracellular quality information data from said set of external cells.

12. The scheduler selector according to claim 8, wherein the selecting means arranged to switch between two schedulers having different minimum user related transmission quality ($q_u$).

13. The scheduler selector according to claim 8, wherein the selecting means is arranged to:
 select a proportional fair scheduler if the intracellular quality is determined by comparison to be higher than the intracellular quality information data from said set of external cells, and;
 select a max rate scheduler, if the intracellular quality is determined by comparison to be lower than or equal to the intracellular quality information data from said set of external cells.

14. The scheduler selector according to claim 8, wherein the defined set of external cells are neighbouring cells.

* * * * *

UNITED STATES PATENT AND TRADEMARK OFFICE
CERTIFICATE OF CORRECTION

PATENT NO.      : 8,036,671 B2                                                Page 1 of 1
APPLICATION NO. : 12/159452
DATED           : October 11, 2011
INVENTOR(S)     : Furuskar et al.

Figure 8:
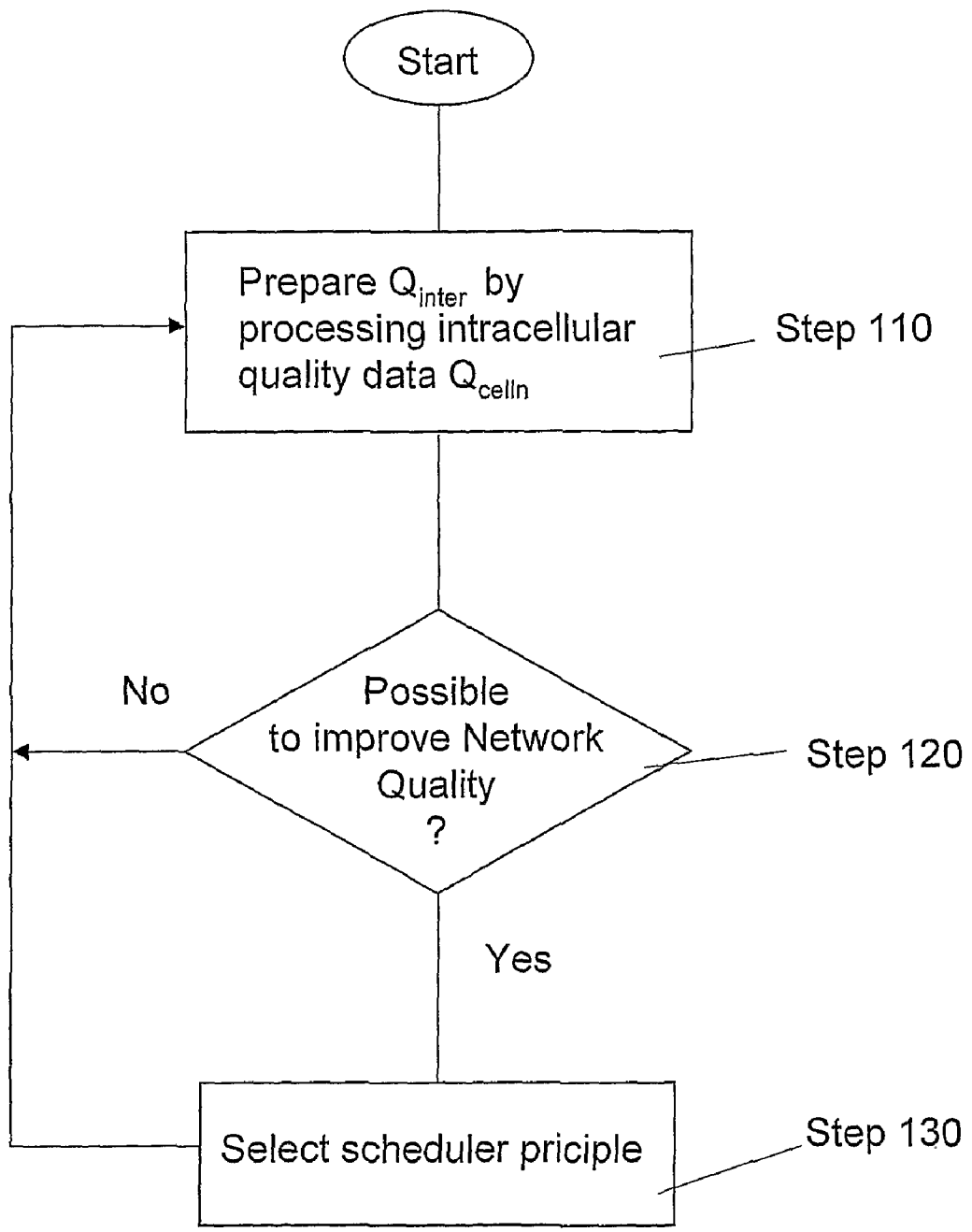
FIG. 8 is a flowchart illustrating the invented method.

It is certified that error appears in the above-identified patent and that said Letters Patent is hereby corrected as shown below:

In Fig. 8, Sheet 7 of 7, for Tag "Step 130", in Line 1, delete "priciple" and insert
-- principle --, therefor.

In Column 4, Line 58, delete "impuls" and insert -- impulse --, therefor.

In Column 10, Line 5, in Claim 1, delete "(Qcelln, Qcellm)" and insert -- ($Q_{celln}$, $Q_{cellm}$) --, therefor.

Signed and Sealed this
Thirty-first Day of July, 2012

David J. Kappos
*Director of the United States Patent and Trademark Office*